United States Patent
Zhang et al.

(10) Patent No.: US 11,237,980 B2
(45) Date of Patent: Feb. 1, 2022

(54) FILE PAGE TABLE MANAGEMENT TECHNOLOGY

(71) Applicant: HUAWEI TECHNOLOGIES CO., LTD., Shenzhen (CN)

(72) Inventors: Huan Zhang, Shanghai (CN); Jun Xu, Nanjing (CN); Guanyu Zhu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/910,198

(22) Filed: Jun. 24, 2020

(65) Prior Publication Data

US 2020/0334169 A1   Oct. 22, 2020

Related U.S. Application Data

(63) Continuation of application No. PCT/CN2017/119104, filed on Dec. 27, 2017.

(51) Int. Cl.
  *G06F 12/10* (2016.01)
  *G06F 12/1009* (2016.01)
  *G06F 12/0882* (2016.01)
  *G06F 12/14* (2006.01)

(52) U.S. Cl.
  CPC ...... *G06F 12/1009* (2013.01); *G06F 12/0882* (2013.01); *G06F 12/1458* (2013.01); *G06F 2212/7201* (2013.01)

(58) Field of Classification Search
  CPC ......... G06F 12/1009; G06F 2212/7201; G06F 12/0882; G06F 12/1458
  USPC ....................................................... 711/154
  See application file for complete search history.

(56) References Cited

U.S. PATENT DOCUMENTS

| | | | | |
|---|---|---|---|---|
| 8,930,647 | B1* | 1/2015 | Smith | G06F 30/392 711/154 |
| 2010/0332732 | A1* | 12/2010 | Chiang | G06F 12/0246 711/103 |
| 2014/0208061 | A1 | 7/2014 | Cohen | |
| 2014/0289492 | A1* | 9/2014 | Ranjith Reddy | G06F 3/061 711/170 |
| 2016/0378680 | A1* | 12/2016 | Sha | G06F 12/109 711/209 |

FOREIGN PATENT DOCUMENTS

| | | |
|---|---|---|
| CN | 102486751 A | 6/2012 |
| CN | 105022696 A | 11/2015 |
| CN | 106528453 A | 3/2017 |

* cited by examiner

*Primary Examiner* — Hua J Song
(74) *Attorney, Agent, or Firm* — Maier & Maier, PLLC

(57) ABSTRACT

A file page table management method. The file page table management method is applied to a storage system in which a file system is created in a memory. According to the file page table management method, a mapping manner of a file page table can be dynamically adjusted based on an access type of an access request for accessing the memory, thereby improving memory access efficiency and saving memory space.

18 Claims, 13 Drawing Sheets

| Access type | | Sequential access | | | Random access | | |
|---|---|---|---|---|---|---|---|
| File name | Offset address | Small granularity (less than 4 KB) | Medium granularity (greater than 4 KB and less than 64 KB) | Large granularity (greater than or equal to 64 KB) | Small granularity (less than 4 KB) | Medium granularity (greater than 4 KB and less than 64 KB) | Large granularity (greater than or equal to 64 KB) |
| FILE_1 | 0 MB | 11 | 8 | 2 | 133 | 17 | 6 |
| | 2 MB | 388 | 35 | 13 | 76 | 13 | 7 |
| | 4 MB | 112 | 278 | 22 | 8 | 30 | 5 |
| | ... | ... | ... | ... | ... | ... | ... |
| FILE_2 | 0 MB | 411 | 38 | 52 | 33 | 87 | 26 |
| | 2 MB | 88 | 35 | 13 | 676 | 103 | 57 |
| | 4 MB | 11 | 8 | 2 | 133 | 17 | 6 |
| | ... | 0 | 0 | 0 | 0 | 0 | 0 |
| ... | 0 MB | 11 | 8 | 2 | 133 | 17 | 6 |
| | 2 MB | 388 | 35 | 13 | 76 | 13 | 7 |
| | 4 MB | 112 | 278 | 22 | 8 | 30 | 5 |
| | ... | 0 | 0 | 0 | 0 | 0 | 0 |

FIG. 7

FILE PAGE TABLE MANAGEMENT TECHNOLOGY

CROSS-REFERENCE TO RELATED APPLICATIONS

This application is a continuation of International Application No. PCT/CN2017/119104, filed on Dec. 27, 2017, the disclosure of which is hereby incorporated by reference in its entirety.

TECHNICAL FIELD

An exemplary embodiment relates to the field of storage technologies, and in particular, to a file page table management technology.

BACKGROUND

With the development of a next-generation non-volatile memory (NVM) technology represented by a phase change memory (PCM), a resistive random access memory (RRAM), a magnetoresistive random access memory (MRAM), and a ferroelectric random access memory (FRAM), an access speed of a next-generation NVM is greatly increased. In addition, the next-generation NVM is capable of performing addressing by byte, and data is written into the next-generation NVM by byte. Therefore, the next-generation NVM may be used as a memory, the NVM storage medium is managed in a page-based manner, and a CPU directly accesses the NVM. An NVM-based memory file system is also provided in the prior art. When a memory is an NVM, storage space of the NVM needs to be mapped to a virtual address space of an operating system, and a virtual address of the operating system is mapped to a physical address of the NVM by using a page table of the operating system, so that a processor can search a mapping table by using a memory management unit (MMU), to implement translation from the virtual address to the physical address and access a page of a file in the NVM according to the translated physical address.

SUMMARY

Embodiments provide a file page table management technology, to dynamically adjust a file page table based on an access type of a file system, and improve memory access efficiency.

According to a first aspect, an embodiment provides a file page table management method. The method is applied to a storage system that includes a processor and a memory, and the storage system includes a file system created based on the memory. The processor collects statistics about types of access to a first file in the file system within a first time period. When the processor determines that a quantity of first access types is greater than a quantity of second access types during the access to the first file within the first time period and a mapping manner of a first file page table is a first mapping manner, the processor adjusts the first file page table from the first mapping manner to a second mapping manner. The first access type includes sequential access and large-granularity random access, and the second access type includes small-granularity random access. The first file page table is used to record a mapping relationship between a virtual address of an operating system and a memory page that stores data of the first file in the memory, and the first mapping manner includes establishing a mapping relationship between the virtual address of the operating system and a first-type page in the memory. The first-type page stores the data of the first file. The second mapping manner includes establishing a mapping relationship between the virtual address of the operating system and a second-type page in the memory, and a size of the second-type page is greater than a size of the first-type page.

Based on the page table management method provided in this embodiment, a mapping manner of a file page table can be dynamically adjusted based on an access type of an access request for accessing the file system within a preset time period. For example, when access requests for the first file include a relatively large quantity of access requests for a sequential access type and a large-granularity random access type, the mapping manner of the first file page table can be adjusted from the first mapping manner of mapping to a small page to the second mapping manner of mapping to a large page. In this case, when an adjusted page table processes a subsequent access request, a translation lookaside buffer TLB hit rate can be improved during address translation.

In a first possible implementation of the first aspect, the adjusting the first file page table from the first mapping manner to a second mapping manner includes: allocating, by the processor, a second page in the memory to the first file, where the second page belongs to the second-type page; and copying, by the processor to the second page, data of a plurality of consecutive first-type pages to which the page table points; and updating, by the processor, a pointer from pointing to the plurality of first-type pages in the page table to pointing to the second page.

With reference to the first aspect or the first possible implementation of the first aspect, in a second possible implementation, the method further includes: releasing, by the processor, a plurality of consecutive first-type pages.

With reference to the first aspect, or the first or the second possible implementation of the first aspect, in a third possible implementation, the method further includes: processing, by the processor based on an adjusted first file page table, a subsequent access request for accessing the first file.

According to a second aspect, an embodiment provides another file page table management method. The method is applied to a storage system that includes a processor and a memory, and the storage system includes a file system created based on the memory. According to the management method, the processor collects statistics about types of access to a second file in the file system within a first time period. When the processor determines that a quantity of first access types is not greater than a quantity of second access types during the access to the second file within the first time period and a mapping manner of a second file page table is a second mapping manner, adjusting, by the processor, the second file page table from the second mapping manner to a first mapping manner. The first access type includes sequential access and large-granularity random access, and the second access type includes small-granularity random access. The second file page table is used to record a mapping relationship between a virtual address of an operating system and a memory page that stores data of the second file in the memory, and the second mapping manner includes establishing a mapping relationship between the virtual address of the operating system and a second-type page in the memory. The second-type page stores the data of the second file. The first mapping manner includes establishing a mapping relationship between the virtual address of the operating system and a first-type page in the memory, and a size of the first-type page is less than a size of the second-type page.

According to the file page table management method provided in the second aspect, the processor in the storage system can dynamically adjust a mapping manner of a file page table based on an access type of an access request for accessing the file system within a preset time period. For example, when access requests for the second file include a relatively small quantity of access requests for a sequential access type and a large-granularity random access type and a relatively large quantity of access requests for a small-granularity random access type, the processor can adjust the mapping manner of the second file page table from the second mapping manner of mapping to a large page to the first mapping manner of mapping to a small page. In this way, storage space reserved for performing mapping to the large page can be released, and storage space of the storage system can be saved.

In a first possible implementation of the second aspect, the adjusting, by the processor, the second file page table from the second mapping manner to a first mapping manner includes: allocating, by the processor, a next-level page table to a last-level page directory in the second file page table, where the next-level page table includes a plurality of page table entries (PTE), and a page directory entry (PDE) in the last-level page directory points to a second-type page in the memory; splitting, by the processor, the second-type page to which the second file page table points into a plurality of first-type pages based on addresses; and updating, by the processor, start addresses of the plurality of first-type pages to the plurality of PTEs in the next-level page table; and updating, by the processor, a pointer from pointing to the second-type page in the second file page table to pointing to the next-level page table.

With reference to the second aspect or the first possible implementation of the second aspect, in a second possible implementation, the method further includes: processing, by the processor based on an adjusted second file page table, a subsequent access request for accessing the second file.

According to a third aspect, an embodiment provides a file page table management apparatus. The apparatus is configured to access a file system created based on a memory. The apparatus includes a function module configured to implement the page table management method according to any one of the first aspect or the possible implementations of the first aspect.

According to a fourth aspect, an embodiment provides another file page table management apparatus. The apparatus is configured to access a file system created based on a memory. The apparatus includes a function module configured to implement the page table management method according to any one of the second aspect or the possible implementations of the second aspect.

According to a fifth aspect, an embodiment provides a storage system, including a processor and an NVM. The NVM is used to store a file system and a file. The processor is connected to the NVM by using a memory bus, and the processor is configured to implement the method according to any one of the first aspect or the possible implementations of the first aspect.

According to a sixth aspect, an embodiment provides another storage system, including a processor and an NVM. The NVM is used to store a file system and a file. The processor is connected to the NVM by using a memory bus, and the processor is configured to implement the method according to any one of the second aspect or the possible implementations of the second aspect.

According to a seventh aspect, an embodiment provides a computer program product, including a computer-readable storage medium that stores program code, where an instruction included in the program code is used to perform the method according to any one of the first aspect or the possible implementations of the first aspect.

According to an eighth aspect, an embodiment provides another computer program product, including a computer-readable storage medium that stores program code, where an instruction included in the program code is used to perform the method according to any one of the second aspect or the possible implementations of the second aspect.

BRIEF DESCRIPTION OF DRAWINGS

To describe the technical solutions in the embodiments more clearly, the following briefly describes accompanying drawings required for describing the embodiments. It is clear that the accompanying drawings in the following description show merely some embodiments.

FIG. 7 shows a record table according to an embodiment.

DESCRIPTION OF EMBODIMENTS

To make a person skilled in the art understand technical solutions in the embodiments better, the following clearly describes the technical solutions in the embodiments with reference to accompanying drawings in the embodiments. It is clear that the described embodiments are merely some rather than all of the embodiments.

Figure 1:
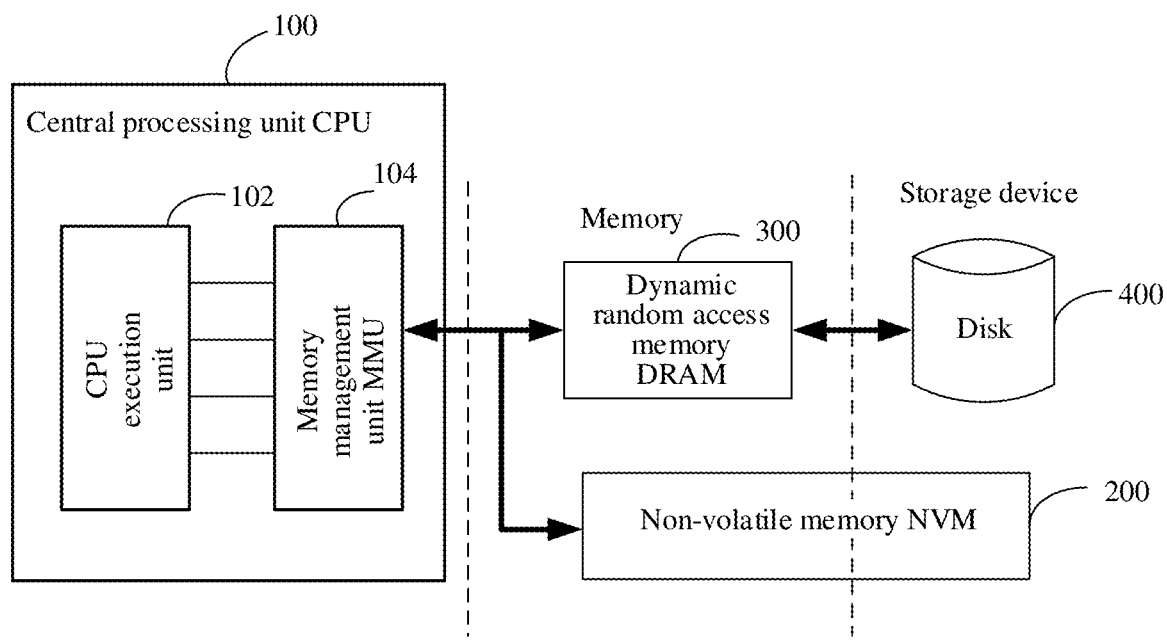
FIG. 1 is a schematic diagram of an application scenario according to an embodiment.

FIG. 1 is a schematic diagram of an application scenario of a next-generation NVM according to an embodiment. In the application scenario shown in FIG. 1, the NVM 200 is used as a memory. As shown in FIG. 1, a dynamic random access memory (DRAM) 300 is connected to a central processing unit (CPU) 100 by using a memory bus. The DRAM 300 has an advantage of a high access speed. The CPU 100 can access the DRAM 300 at a high speed, and perform a read or write operation on any storage unit in the DRAM 300. Therefore, the DRAM may be used as a main memory. The DRAM 300 may be configured to store various running software in an operating system, input and output data, information exchanged with an external memory, and the like. However, the DRAM 300 is volatile. After a computer is powered off, information in the DRAM 300 is no longer stored.

A disk 400 may be used as an external memory to store data. Certainly, it may be understood that a storage medium used as an external memory may be the disk 400, or an NVM such as a solid-state disk (SSD). The storage medium used as the external memory may need to be nonvolatile. When the computer is powered off, data stored on the external memory is still stored. In addition, the external memory has a relatively large storage capacity.

The new type of NVM 200 may be directly connected to the memory bus like the DRAM 300. The CPU 100 may access the NVM 200 by using an MMU 104, and quickly store data to the NVM 200 or read data from the NVM 200. It may be understood that when the NVM 200 is directly connected to the memory bus for use, the NVM 200 can shorten a data access latency like the DRAM 300. In addition, compared with the DRAM 300, the NVM 200 can store data better by virtue of non-volatility.

It should be noted that the NVM that is described in this embodiment and that can be connected to the memory bus may include a new type of NVM such as a PCM, an RRAM, an MRAM, or an FRAM. All these new types of NVMs have characteristics of a high access speed and non-volatility. In addition, these new types of NVMs can perform addressing by byte, and data is written into the NVM by byte. In this embodiment, the NVM used as the memory is also referred to as an NVM. Unless otherwise specified, the memory in this embodiment is an NVM.

This embodiment relates to a memory-based file system, and the file system created based on a file may also be referred to as a memory file system. For example, in this embodiment, the NVM 200 stores a file system and a file. A person skilled in the art may know that the file system is a software structure responsible for managing and storing file information in the operating system. From a perspective of a system, the file system is a system for organizing and allocating space of a file storage device, storing a file, and protecting and retrieving the stored file. The file system includes three parts: a file system interface, a file manipulation and management software set, and file data and attributes. Core concepts of the file system are a superblock, an inode, a data block, a directory block, and an indirect block. The superblock includes overall information of the file system, such as a file system size. The inode includes all information about a file except a file name. The file name is stored in the directory block together with a quantity of inodes, and directory entries include the file name and the quantity of inodes of the file. There is only a small amount of data block space in the inode. If more data block space is required, space of pointers pointing to data blocks is dynamically allocated. These dynamically allocated blocks are indirect blocks. In this embodiment, the NVM 200 may further store data and metadata of the file.

An operating system and another software program are installed on the CPU 100, so that the CPU 100 can access the DRAM 300, the disk 400, and the NVM 200. The CPU 100 may include a CPU execution unit 102 and the MMU 104. The CPU execution unit 102 is a device for executing the CPU 100, and is configured to execute a program. The MMU 104 is computer hardware responsible for processing a memory access request of the CPU 100, and is a control line used to manage a virtual memory and a physical memory in the CPU 100. In addition, the MMU 104 is also responsible for mapping a virtual address to a physical address, and provides memory access authorization of a hardware mechanism.

It may be understood that, in this embodiment, the CPU 100 is merely an example of a processor. In addition to the CPU 100, the processor may be another application-specific integrated circuit (ASIC) or may be one or more integrated circuits configured to implement this embodiment.

It may be understood that the application scenario shown in FIG. 1 may include a storage device that creates a file system based on a memory. In this embodiment, the storage device may include a device, such as a computer, a server, or a storage array, that creates a memory file system. No limitation is imposed on the application scenario of this embodiment herein. It should be noted that, in this embodiment, unless otherwise specified, the described memory is an NVM. For example, the memory may be the NVM 200 in FIG. 1.

To better understand this embodiment, the following describes in detail how an MMU implements mapping from a virtual address to a physical address of a memory. First, a concept of the virtual memory is briefly described. A person skilled in the art may know that the program needs to be run in a memory. However, as a program scale increases continuously, it is difficult for a memory capacity to accommodate an entire program, and therefore a concept of a virtual memory emerges. A basic idea of the virtual memory is that a total capacity of a program, data, and a stack may exceed a capacity of a physical memory. The operating system reserves a currently used part into a memory, and stores another unused part into a disk. For example, if a computer has only a 4 MB memory, when the computer needs to run a 16 MB program, the operating system may choose to determine to buffer 4 MB program fragment into the memory and run the 4 MB program fragment, and when necessary, exchange program fragments between the memory and the disk. In this case, the 16 MB program can be run on the computer having the only 4 MB memory.

A person skilled in the art may know that, in a computer system, a virtual address space is a range of a virtual address accessible by a process. A size of the virtual address space may be determined by an instruction set architecture of a computer. For example, a 32-bit CPU provides a virtual address space of 0-0xFFFFFFFF (4 GB). An address in the virtual address space is referred to as a virtual address. The virtual address space and the virtual address are respectively corresponding to a physical address space and a physical address. The physical address space is a physical address range of a memory. An address in the physical address space is referred to as a physical address. The physical address space may be less than the virtual address space, and the physical address space may be mapped to the virtual address space. For example, for a 32-bit x86 host with a memory of 256 MB, a virtual address space range of the 32-bit x86 host is 0-0xFFFFFFFF (4 GB), and a physical address space range of the 32-bit x86 host is 0-000000000-0x0FFFFFFF (256 MB).

In the prior art, most machines use a virtual memory, a virtual address (or referred to as a linear address) is not directly sent to a memory address bus, but is sent to an MMU, and the MMU translates the virtual address into a physical address. In other words, the MMU is configured to map a virtual address of a program to a physical address of a memory.

To map a virtual address of a program to a physical address of a memory, a paging mechanism is introduced in the MMU. For example, the virtual address space is divided by page, and a page in the virtual address space may be referred to as a virtual page. Correspondingly, the physical address space is also divided by page, and a page in the physical address space may be referred to as a physical page (or referred to as a physical page frame). Sizes of the virtual page and the physical page are the same.

Based on the concept of the page, the MMU implements mapping from the virtual address to the physical address of the memory in a form of a multi-level page table. For example, in a level-2 management mode, this mapping manner sequentially includes querying a page directory and a page table. The page directory stores base addresses of a plurality of page tables, and each page table stores a plurality of PTEs. The page table entry (PTE) records a physical base address of a physical page corresponding to the virtual address.

A person skilled in the art may know that a virtual address includes information about a found physical address. When a size of a virtual address is 4 bytes (32 bits), the virtual address may be divided into 3 parts:

Bit 22 to bit 31: The 10 bits (the most significant 10 bits) are an index in a page directory.

Bit 12 to bit 21: The 10 bits are an index in a page table.

Bit 0 to bit 11: The 12 bits (the least significant 12 bits) are an intra-page offset.

A person skilled in the art may know that each process has its own dedicated virtual address space and a page directory used for addressing, all processes in the system share a virtual address space of a kernel and a page directory of the kernel, and each process may enter the kernel through system calling. In the CPU, there is a register CR3 for storing a base address of the page directory. During process scheduling, the register CR3 points to a base address of a page directory of a current process. During process switching, the register CR3 switches the base address of the currently pointed page directory. For a virtual address to be translated into a physical address, the CPU first finds, based on a value in the register CR3, a physical page on which the page directory is located. Then the CPU finds a corresponding PDE by using values of the 10 bits (the most significant 10 bits), for example, bit 22 to bit 31, of the virtual address as an index. The PDE includes a physical address of a page table corresponding to the virtual address. With the physical address of the page table, the CPU finds a corresponding PTE in the page table by using values of the 10 bits, for example, bit 12 to bit 21, of the virtual address as an index. The PTE includes a physical base address of a physical page corresponding to the virtual address. Finally, the physical address corresponding to the virtual address is obtained by adding the physical base address of the physical page to the least significant 12 bits of the virtual address, that is, the intra-page offset.

A page directory may include 1024 entries, and 1024 entries (the tenth power of 2 is equal to 1024) may be indexed exactly by using the most significant 10 bits of the virtual address. A page table also includes 1024 entries, and the middle 10 bits of the virtual address are exactly used to index the 1024 PTEs. The least significant 12 bits (the 12th power of 2 is equal to 4096), used as the intra-page offset, of the virtual address may be used to index 4 KB exactly, that is, each byte on a physical page.

A person skilled in the art may know that an addressing range of a 32-bit pointer is 0x00000000-0xFFFFFFFF (4 GB). That is, the 32-bit pointer can address each byte in the entire 4 GB address space. One PTE may be responsible for a mapping relationship between a 4 KB address space and a physical memory. If a page table includes 1024 entries, the page table may be responsible for mapping of an address space of 1024×4 KB=4 MB. One PDE corresponds to one page table. A page directory includes 1024 entries, that is, corresponding to 1024 page tables. Each page table is responsible for mapping of an address space of 4 MB, and the 1024 page tables are responsible for mapping of an address space of 1024×4 MB=4 GB. One process includes one page directory. Therefore, in a unit of a page, the page directory and the page table can ensure a mapping relationship between each page in the address space of 4 GB and a physical memory.

Each process includes an address space of 4 GB, for example, 0x00000000-0xFFFFFFFF. A virtual address of each process is mapped to a physical address of a memory by using a page directory and page tables of the process. Because all processes include respective page directories and page tables, physical memories to which address spaces of the processes are mapped are different. Values at identical virtual addresses (if mapping to a physical memory occurs in both processes) of the two processes may be different because different processes may correspond to different physical pages.

The foregoing describes in detail a process of mapping the virtual address of the program to the physical address of the memory by the MMU. In this embodiment, the NVM 200 is used as a memory, and the NVM 200 can store the data for a long time. Therefore, the file system can be created in the NVM 200, and the metadata and the file data in the file system are directly stored on the memory NVM 200. The MMU 104 may implement a mapping relationship between the virtual address and the physical address of the NVM 200, so that the CPU 100 can directly access the file system in the NVM 200.

Figure 2:
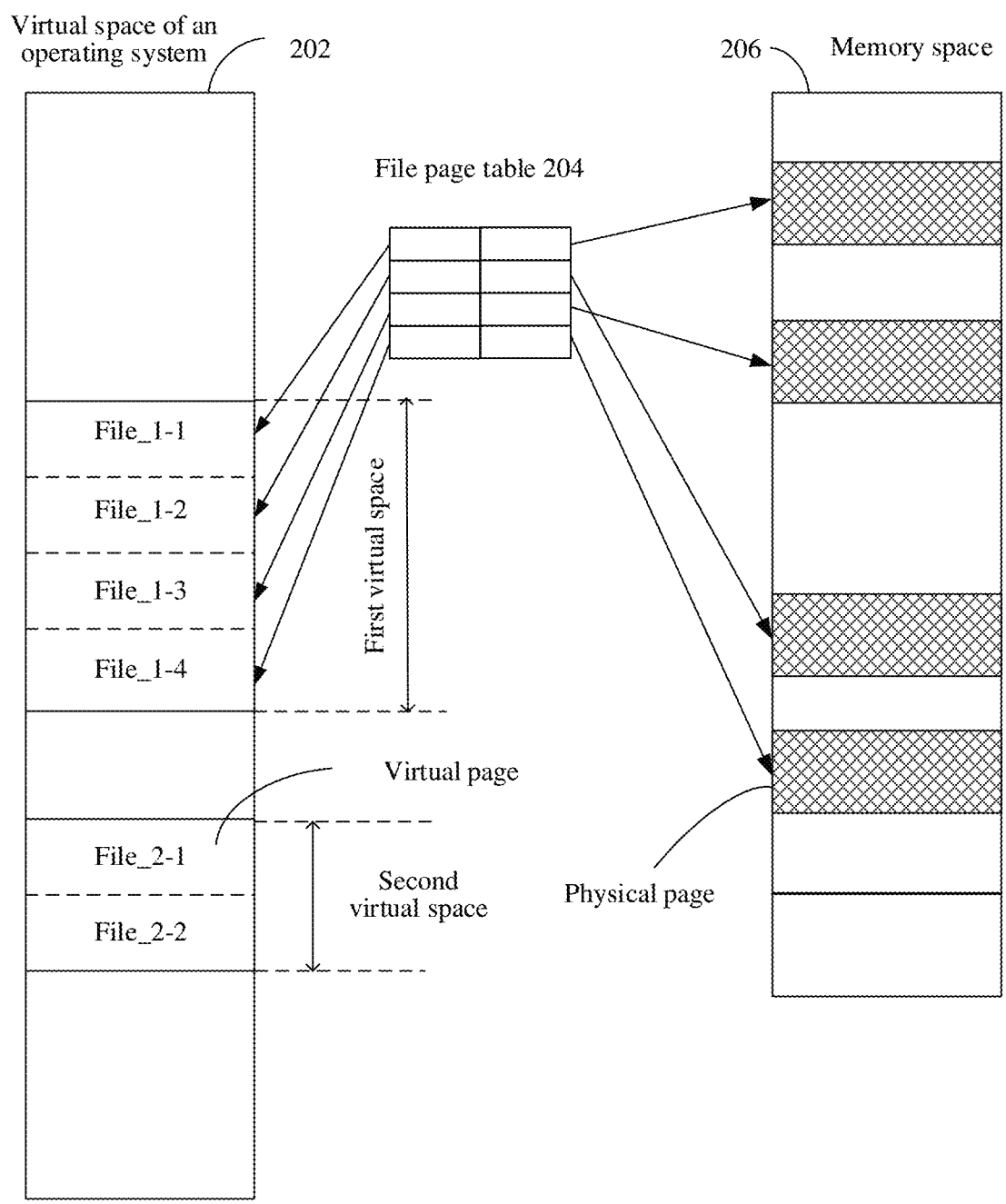
FIG. 2 is a schematic diagram of a mapping relationship between a virtual space of an operating system and memory space by using a file page table 204 according to an embodiment.

FIG. 2 is a schematic diagram of a mapping relationship between a virtual space 200 of an operating system and memory space 206 by using a file page table according to an embodiment. As shown in FIG. 2, a first file (File_1) is stored in the memory space 206 of a memory 200. For example, there are four inconsecutive physical pages in the memory space 206 shown in FIG. 2 (which are four physical pages with grid parts in FIG. 2). For ease of description, the four physical pages storing the first file are referred to as a first physical space (not shown in FIG. 2). A first virtual space is a consecutive address space virtualized based on the first physical space. It may be understood that a size of the first virtual space is not less than a size of the first physical space. The first virtual space is a part of the virtual space 202 of the operating system. For example, as shown in FIG. 2, the virtual space 202 of the operating system includes the first virtual space for managing the first file (File_1), and further includes a second virtual space for managing a second file (File_2) and other virtual spaces for managing other files (not shown in FIG. 2). For ease of description, the following uses the first virtual space as an example for description. To manage the first file (File_1), that the size of the first virtual space is equal to the size of the first physical space is used as an example. The first virtual space includes four virtual pages, and a size of each virtual page is the same as a size of a physical page in the memory. For example, both the size of the virtual page and the size of the physical page may be 4 KB. The four virtual pages of the first virtual space are respectively used to virtually store four physical pages of data of the first file File_1 (for example, File_1-1, File_1-2, File_1-3, and File_1-4), and are respectively mapped to the four physical pages in the memory. In this embodiment, a virtual page of the virtual space 202 of the operating system may be mapped to a physical page in the memory space 206 of the memory by using the file page table 204.

Figure 3A:
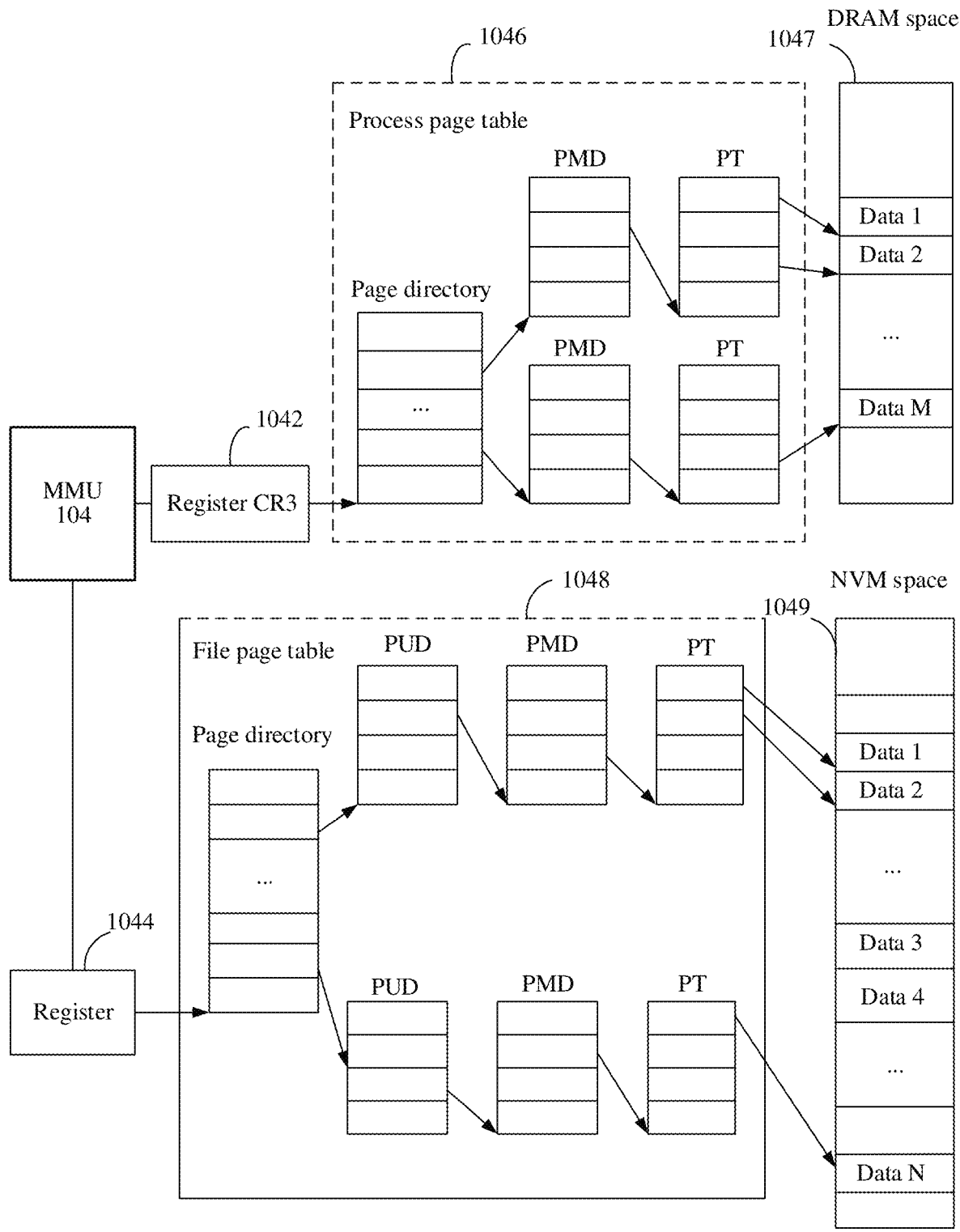
FIG. 3A is a schematic diagram of a file page table according to an embodiment.

FIG. 3A is a schematic diagram of a file page table according to an embodiment. The page table shown in FIG. 3A includes a process page table 1046 and a file page table 1048. A process is a basis of an operating system structure. The process is a running activity, related to a data set, of a program having an independent function, and may be considered as one program execution. Each process has a dedicated virtual address space and a page directory used for addressing. In this embodiment, the process page table 1046 is used to map a virtual address to a physical address in an executable program other than access to a file system. The MMU 104 may access the register CR3 and the process page table 1046, to map a virtual address of the operating system to a physical address of a DRAM memory. In other words, the process page table 1046 may also be a conventional memory page table. The file page table 1048 is a page table that needs to be used by a CPU 100 to access the file system. In an exemplary application, the MMU 104 may access different registers to access different page tables. For example, as shown in FIG. 3A, the MMU 104 may access the process page table 1046 by using the register CR3 1042 and access the file page table 1048 based on a file management register 1044.

In an exemplary embodiment, one file page table (which may also become a global file page table) may be created for the entire file system, or one file page table may be created for each file in the file system. This is not limited herein. In this manner, the file page table 1048 shown in FIG. 3A may be a global file page table or a file page table for one file. When the page table is a global page table, directory entries in a page directory may point to page tables for different files in the file system. When the file page table is a page table for one file, directory entries in a page directory may point to different parts of the file. This is not limited herein. As shown in FIG. 3A, the MMU 104 in the CPU 100 may access a file page table (for example, the file page table 1048 in FIG. 3A) by accessing the register. For example, the MMU 104 may access the process page table 1046 by accessing the register CR3 1042, and the MMU 104 may access the global file page table 1048 by accessing the file management register 1044. The register CR3 1042 stores a base address of the page directory in the process page table 1046, and the file management register 1044 stores a base address of the page directory in the global file page table 1048. The process page table 1046 is used to point to a physical address of a physical page in DRAM space 1047. The global file page table 1048 is used to point to a physical address of a physical page in NVM space 1049. Both the process page table 1046 and the global file page table 1048 may be single-level page tables or multi-level page tables. For example, as shown in FIG. 3A, the file page table 1048 may include a page directory, a page upper directory (PUD), a page middle directory (PMD), and a page table. Each PTE in the page table stores a physical address pointing to a memory page (which may also be referred to as a physical page) in the NVM space 1049.

Figure 3B:
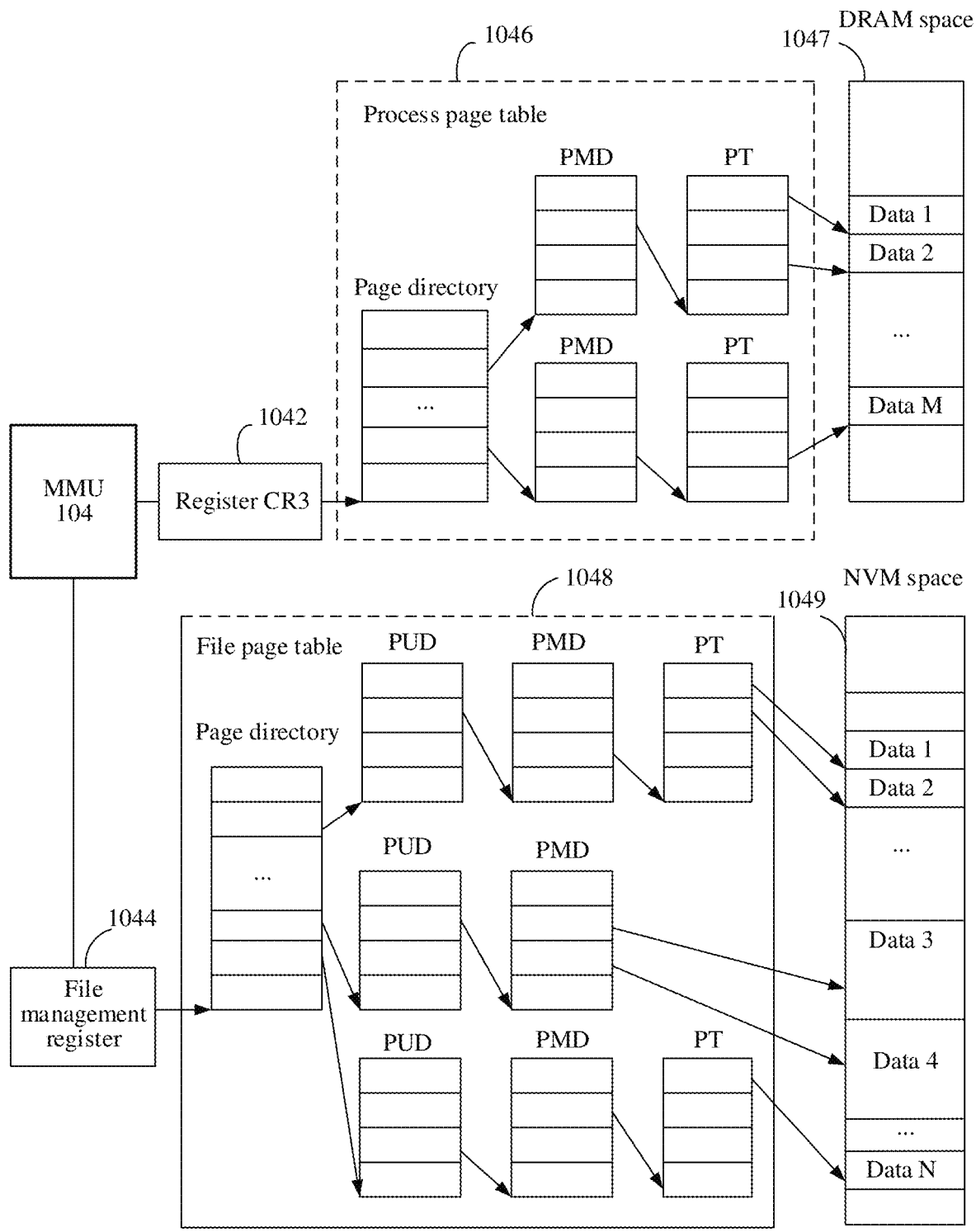
FIG. 3B is a schematic diagram of another file page table according to an embodiment.

It should be noted that, in the embodiments, not all page tables for all files are necessarily mapped based on memory pages of a same size. For example, as shown in FIG. 3B, file page tables for some files may be mapped based on a large page, and file page tables for other files may be mapped based on a small page. Some page tables may be single-level page tables, and the other pages may be multi-level page tables. In addition, levels of the multi-level page tables may differ. For example, as shown in FIG. 3B, a file page table for mapping based on a small page (for example, a page of 4 KB) may be a four-level page table, and a page table for mapping based on a large page (for example, a page of 2 MB) may be a three-level page table. Levels of the fourth-level page table include a PD, a PUD, a PMD, and a PT. Levels of the three-level page table may include a PD, a PUD, and a PMD.

It should be noted that, for clarity of description, the process page table and the file page table are separately shown and described in FIG. 3A and FIG. 3B. In an exemplary embodiment, the process page table and the file page table may be combined in form. When the process page table and the file page table are combined, one part of the page table points to the file system, and the other part points to data other than the file system. The MMU 104 may access one page table by using one register, with no need to access different page tables by using two registers respectively.

Figure 4:
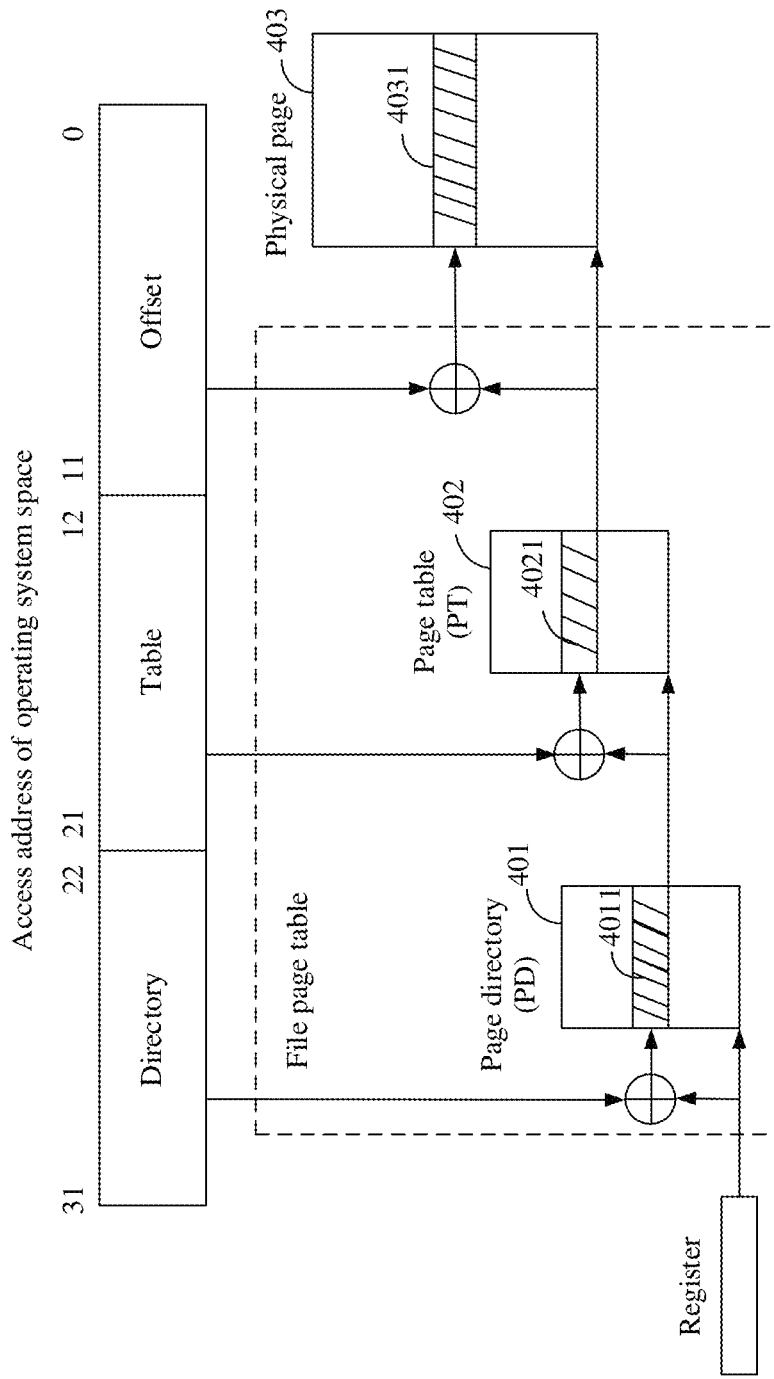
FIG. 4 is a schematic diagram of a method for accessing a memory file system based on a file page table according to an embodiment.

For clarity of description, the following describes, with reference to FIG. 4, how a CPU 100 accesses a memory file system based on a virtual address in an access request. For ease of description, in FIG. 4, an example in which an access address is a 32-bit virtual address and a file page table is a two-level page table is used for description. As shown in FIG. 4, the file page table may include a page directory 401 and a page table 402. During an exemplary access, the MMU 104 may obtain a base address of the page directory 401 in the file page table by accessing a register, and find a PDE 4011 in the page directory 401 by using the base address of the page directory 401 as a start address and using, as an offset, the most significant 10 bits (bit 22 to bit 31) of an access address carried in the access request. The PDE 4011 includes a start physical address of the page table 402. A PTE 4021 is found on the page table 402 according to the start physical address of the page table 402 by using the middle 10 bits (bit 12 to bit 21) of the access address in the access request as an offset. A start physical address of a first file on a physical page 403 in a memory (for example, the NVM 200 shown in FIG. 1) is stored in the PTE 4021. A to-be-accessed line 4031 is found on the physical page 403 according to the start physical address of the physical page 403 by using the least significant 11 bits (bit 0 to bit 11) of the access address as an offset. The address of the line 4031 is a start physical address of to-be-accessed data in the memory.

It may be understood that, because data may be read/written during memory access at a granularity of a line, after the to-be-accessed line 4031 is determined, an access operation may be performed on the NVM 200 according to a physical address of a start location of this access. For example, if a first access request is a read request, a location of the line 4031 on the physical page 403 may be used as a data-reading start location, and a data reading instruction is sent to a memory controller according to the physical address of the data-reading start location, to instruct the memory controller to perform a read operation on a first target file. If a first access request is a write request, a new-data-writing start location may be obtained according to a location of the line 4031, and a data write instruction is sent to a memory controller according to a physical address of the new-data-writing start location, to instruct the memory controller to perform a write operation on a first target file, to access the first target file.

The foregoing describes in detail how to access the memory file system by using the file page table in this embodiment. A person skilled in the art may know that, to increase a memory access speed, the MMU 104 further includes a translation lookaside buffer (TLB). The TLB may also be referred to as a page table buffer or a translation bypass buffer. The TLB is a high-speed cache of a CPU, and is configured to increase a speed of translating a virtual address into a physical address by the MMU. The TLB stores some memory page table items used to map a virtual address to a physical address. A TLB search key is a virtual memory address, and a TLB search result is the physical address. In a memory access process, if a requested virtual address is present in the TLB (which is also referred to as a TLB hit), a physical address matching the requested virtual address is quickly obtained, and the CPU can use the obtained physical address to access the memory. If a requested virtual address is not present in the TLB (which is also referred to as a TLB non-hit or a TLB miss), the MMU translates a virtual address into a physical address by using a memory page table, and an access speed of the memory page table is much lower than that of the TLB. In this embodiment, to increase a speed of accessing the memory file system, the MMU 104 also includes a TLB (not shown in FIG. 1). The TLB caches some PTEs of the file page table, and the MMU may quickly access the memory file system according to the some PTEs of the file page table that are cached in the TLB.

The foregoing describes the manner of accessing the memory file system based on the file page table according to this embodiment. As described above, in an existing memory file system, when mapping from a virtual address of an operating system to a physical address of a memory is established, a file page table may be fixedly implemented in a large-page or small-page mapping manner. For a mapping manner of performing address mapping by using a small page of 4 KB, the operating system can address a page of 4 KB in the memory based on the page table. However, when memory address mapping is performed at a granularity of 4 KB, a large quantity of PTEs are generated, and the quantity of PTEs is far greater than a maximum capacity of the TLB in the MMU 104. Because only some PTEs can be cached in the TLB, when a quantity of PTEs in the page table increases, a TLB hit rate is reduced in a process of implementing address translation by using the MMU. For a mapping manner of performing address mapping by using a large page (for example, a size of a page is 2 MB), the operating system can address a page of a 2 MB in the memory based on the page table. Performing address mapping by using a large page (for example, performing address mapping by using the large page of 2 MB) can reduce a quantity of PTEs in a page table and increase a TLB hit rate. However, such a large-page mapping manner cannot dynamically adjust usage of a large page, and needs to reserve storage space for the large page during initialization. If the reserved storage space is not used, a waste of the storage space is caused. Consequently, this implementation is inflexible.

Figure 5:
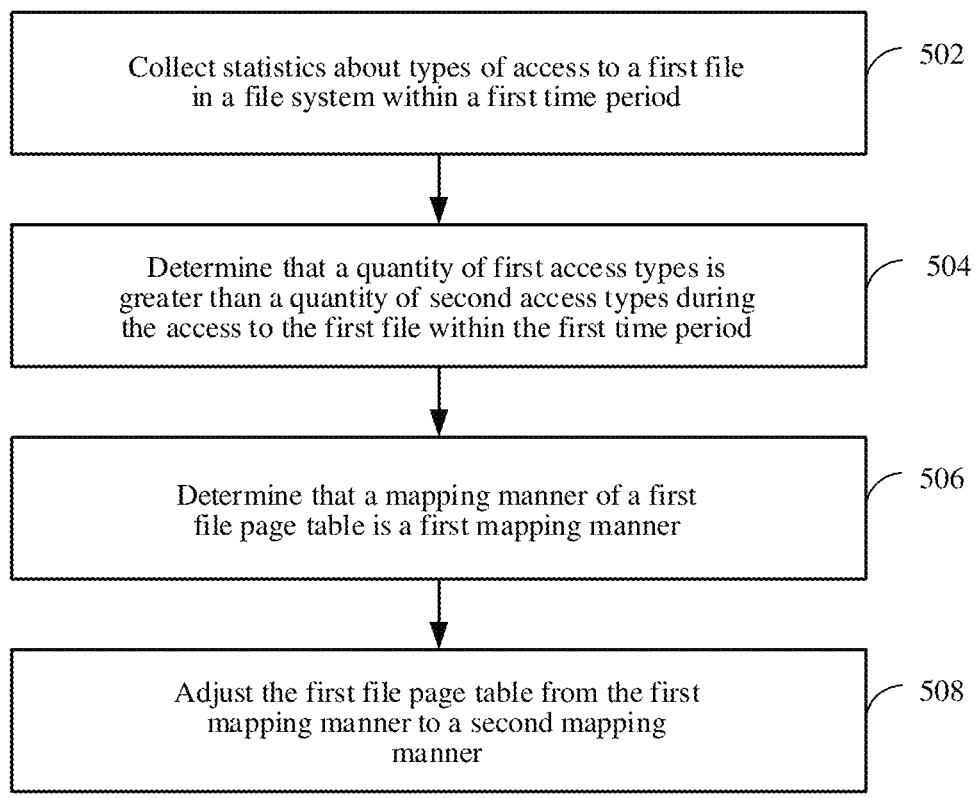
FIG. 5 is a flowchart of a file page table management method according to an embodiment.

To resolve the foregoing problem, an embodiment provides a file page table management method, to dynamically adjust a page table mapping manner of a file based on a file system access manner and reduce a waste of storage space while increasing a TLB hit rate. FIG. 5 is a flowchart of a file page table management method according to an embodiment. The method may be applied to the storage device in FIG. 1 on which the file system is created based on the memory. As described above, on the storage device shown in FIG. 1, all data of the file system may be stored on the NVM 200. The CPU 100 may manage space of the NVM 200 in a form of a physical page. The method shown in FIG. 5 may be performed by a processor of a device such as a storage device, a computer, or a server on which a file system is created based on the memory, for example, by the CPU 100 shown in FIG. 1. The following describes in detail the method in FIG. 5 with reference to FIG. 1. As shown in FIG. 5, the method may include the following steps.

In step 502, the processor collects statistics about types of access to the first file in the file system within a first time period. In this embodiment, the access types may include sequential access and random access. The sequential access includes small-granularity sequential access and large-granularity sequential access. The random access includes small-granularity random access and large-granularity random access. The sequential access means that an access address at a time point T and an access address at a time point (T-1) are consecutive. The random access means that the access address at the time point T and the access address at the time point (T-1) are inconsecutive. The small-granularity sequential access means that access address at the time point T and the access address at the time point (T-1) are consecutive, and that a size of data accessed at the time point T is less than a first threshold. The large-granularity sequential access means that the access address at the time point T and the access address at the time point (T-1) are consecutive, and that the size of the data accessed at the time point T is greater than a second threshold. The second threshold is not less than the first threshold. The time point T is any time point.

Figure 6:
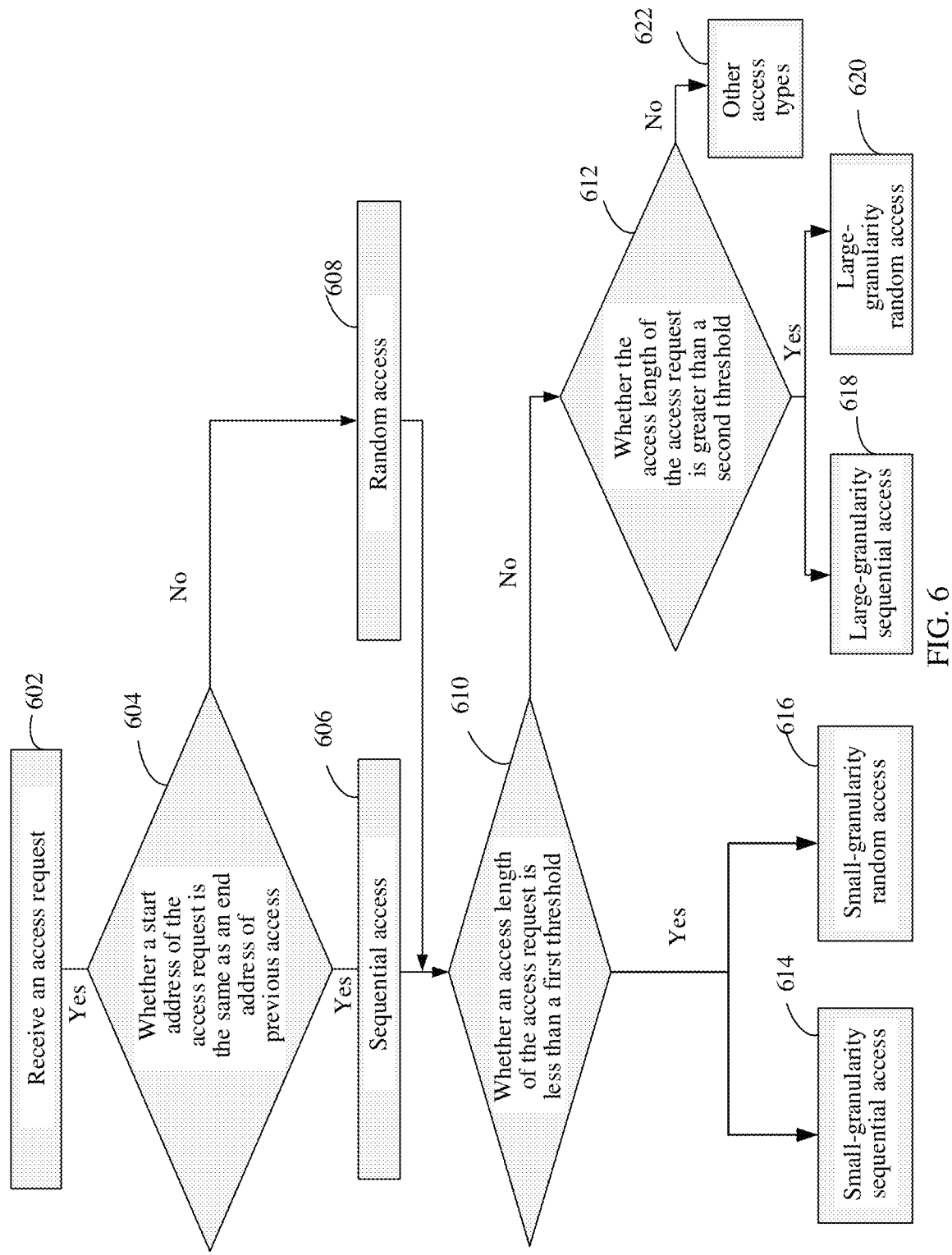
FIG. 6 is a flowchart of an access type determining method according to an embodiment.

In an exemplary embodiment, access information of accessing the first file at the time point T may be compared with access information at the time point (T-1), to determine a type of access to the first file at the time point T. The access information includes an access address and a length. The following example describes, with reference to FIG. 6, how to determine an access type. FIG. 6 is a flowchart of an access type determining method according to an embodiment. As shown in FIG. 6, the method includes the following steps.

In step 602, a processor receives an access request, where the access request carries a start address and an access length of a to-be-accessed file. In this embodiment, the start address carried in the access request is a virtual address of an operating system. The start address is used to determine a start location of data of a to-be-accessed first file. It may be understood that, in an exemplary embodiment, the access request may further carry an identifier of the to-be-accessed first file, and the processor may obtain an index node of the first file in the file system based on the identifier of the first file. For ease of description, an access request received at a time point T is used as an example for description in FIG. 6.

In step 604, the processor determines whether the start address of the access request is the same as an end address of previous access. In other words, in this step, the processor determines whether the start address of the access request (that is, the access request at the time point T) is the same as the end address of the access at the time point (T-1). For example, the processor may obtain the end address of the access at the time point (T-1) according to a start address and a length that are carried in a recorded access request at the time point (T-1). In this case, the start address carried in the access request at the time point T may be compared with the end address of the access at the time point (T-1). When the start address of the access request at the time point T is the same as the end address of the access at the time point (T-1), the method proceeds to step 606 in which the processor determines that this access is sequential access. When the start address of the access request at the time point T is different from the end address of the access at the time point (T-1), the method proceeds to step 608 in which the processor determines that this access is random access. Then, the method proceeds to step 610.

In step 610, the processor determines whether the access length of the access request is less than a first threshold. The first threshold may be set according to an exemplary application scenario. For example, the first threshold may be set to 4 KB, 8 KB, or the like. If the processor determines that this access is sequential access in step 606, and the processor further determines that the access length of the access request is less than the first threshold in step 610, the method proceeds to step 614 in which the processor determines that this access is small-granularity sequential access. If the processor determines that this access is random access in step 608, and the processor further determines that the access length of the access request is less than the first threshold in step 610, the method proceeds to step 616 in which the processor determines that this access is small-granularity random access.

If the processor determines that the access length of the access request is not less than the first threshold in step 610, the method further proceeds to step 612. In step 612, the processor determines whether the access length of the access request is greater than a second threshold. The second threshold is not less than the first threshold. For example, both the second threshold and the first threshold may be 4 KB, or the second threshold may be greater than the first threshold. For example, the second threshold may be set to 64 KB, 128 KB, or the like. In an exemplary embodiment, a value of the second threshold may be set as long as the value is not less than the first threshold.

If the processor determines that the access length of the access request is greater than the second threshold in step 612, and with reference to step 606, the processor determines that the access is sequential access, the method proceeds to step 618 in which the processor determines that this access is large-granularity sequential access. If the processor determines that the access length of the access request is greater than the second threshold, and with reference to step 608, the processor determines that the access is random access, the method proceeds to step 620 in which the processor determines that this access is large-granularity random access.

If the processor determines that the access length of the access request is not greater than the second threshold in step 612, with reference to step 606 or 608, the processor may determine that this access request is a medium-granularity sequential access request or a medium-granularity random access request. For ease of description, in this embodiment, both the medium-granularity sequential access request and the medium-granularity random access request are referred to as other access types.

It may be understood that in an exemplary embodiment, the second threshold is not necessary. In an exemplary embodiment, only the first threshold may be set. When only the first threshold is set, the access types may include only small-granularity sequential access, large-granularity sequential access, small-granularity random access, and large-granularity random access. In this manner, when determining the access type of the access request, the processor may not need to perform step 612 or step 622 in FIG. 6.

In an exemplary embodiment, after determining the access type of the access to the first file at the time point T, the processor may update a corresponding quantity, recorded in the specified record table, of access instances of the access type. FIG. 7 shows a record table according to an embodiment. FIG. 7 records statuses of accessing different addresses of different files in the file system within a first time period. The first time period may include a preset statistical start time point to the time point T. "File name" is used to indicate a file identifier of an accessed file. "Offset address" is used to indicate an offset between a start address of given access and a start address of the file. In other words, "Offset address" is also used to indicate the start address of this access. An access type may be determined based on a specified first threshold and second threshold. For example, in FIG. 7, the first threshold is 4 KB, and the second threshold is 64 KB. Based on access addresses and lengths, all access types of access may be classified into small-granularity sequential access, medium-granularity sequential access, large-granularity sequential access, small-granularity random access, medium-granularity random access, and large-granularity random access. For example, as shown in FIG. 7, within the first time period, during access to data in a first file File_1 with an offset address of 2 MB, there are a total of 388 instances of small-granularity sequential access, a total of 35 instances of medium-granularity sequential access, a total of 13 instances of large-granularity sequential access, 76 instances of small-granularity random access, a total of 13 instances of medium-granularity random access, and a total of seven instances of large-granularity random access.

FIG. 6 and FIG. 7 are examples of how to determine an access type of access and collect statistics about types of access to the file according to an embodiment. As shown in FIG. 5, in step 504, the processor determines that a quantity of first access types is greater than a quantity of second access types during the access to the first file within the first time period. The first access type includes sequential access and large-granularity random access, and the second access type includes small-granularity random access. For example, in this step, the processor may determine, based on statistical information of the types of the access to the first file within the first time period in the record table shown in FIG. 7, whether the quantity of first access types of the first file is greater than the quantity of second access types. For example, within the first time period, during access to the File_1 with an offset address of 2 MB, there are a total of 388+35+13+7=443 instances of access of the first access type and a total of 76 instances of access of the second access type. In this case, in this step, the processor determines that the quantity of first access types is greater than the quantity of second access types during the access to the first file with the start address of 2 MB within the first time period.

In step 506, the processor determines that a mapping manner of a first file page table is a first mapping manner. The first file page table is used to record a mapping relationship between a virtual address of an operating system and a memory page that stores data of the first file in a memory, the first mapping manner includes establishing a mapping relationship between the virtual address of the operating system and a first-type page in the memory, and the first-type page stores the data of the first file.

Figure 8:
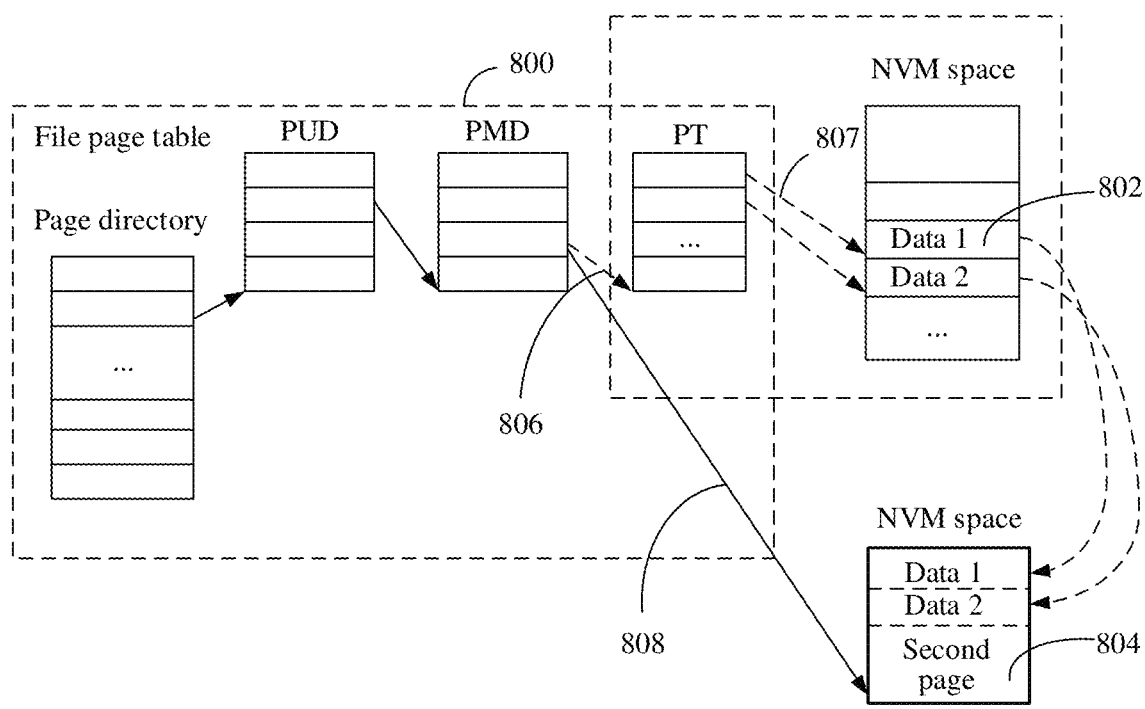
FIG. 8 is a schematic diagram of adjustment of a file page table according to an embodiment.

As described above, in the memory file system, file data in the memory may be recorded by page, and a mapping relationship between the virtual address of the operating system and a physical address of the memory page that stores the file data in the memory is established in a manner of a file page table. In this way, the processor can quickly access the file system in the memory by using the file page table. In this embodiment, a mapping manner in which a file page table is mapped to a small page of a memory page is referred to as a first mapping manner. For example, the mapping manner of the first file page table is shown in FIG. 8. Each PTE in a page table points to a physical page 802 of a size of 4 KB in NVM space. For ease of description, in this embodiment, a small page (for example, a page of a size of 4 KB) is referred to as a first-type page. The first-type page may be shown by 802 in FIG. 8.

In step 508, the processor adjusts the first file page table from the first mapping manner to a second mapping manner. The second mapping manner includes establishing a mapping relationship between the virtual address of the operating system and a second-type page in the memory, and a size of the second-type page is greater than a size of the first-type page. In this embodiment, a large page (for example, a page of a size of 2 MB) is referred to as the second-type page. It may be understood that sizes of the first-type page and the second-type page are not limited as long as the size of the second-type page is greater than the size of the first-type page. For example, when the processor determines that the quantity of first access types is greater than the quantity of second access types during the access to the first file within the first time period, and determines that the first file page table is mapped to the first-type page mapped in the NVM, in this step, the processor adjusts the file page table of the first file from the first mapping manner of mapping to the first-type page to the second mapping manner of mapping to the second-type page. For example, as shown in FIG. 8, in this step, the processor adjusts a pointer from pointing to the first-type page 802 to pointing to the second-type page 804. For example, the processor may adjust the file page table of the first file from the first mapping manner to the second mapping manner according to the method shown in FIG. 9.

Figure 9:
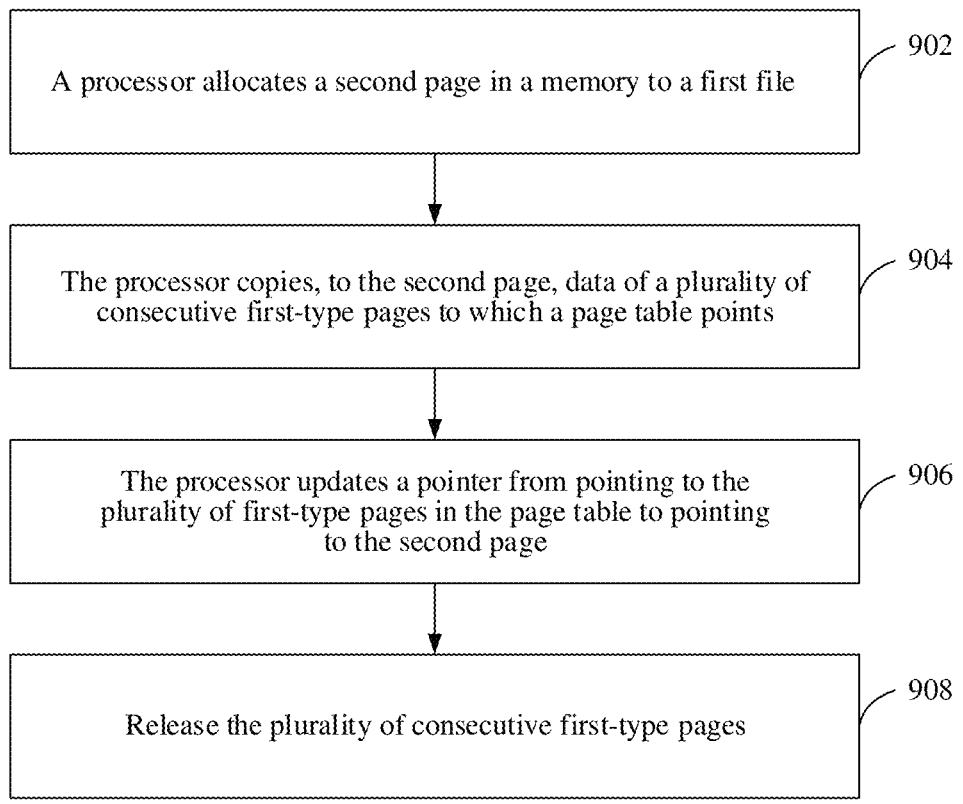
FIG. 9 is a flowchart of a page table adjustment method according to an embodiment.

FIG. 9 is a flowchart of another page table adjustment method according to an embodiment. As shown in FIG. 9, in step 902, the processor allocates a second page in the memory to the first file, where the second page belongs to the second-type page. For example, as shown in FIG. 8, the processor allocates a second page 804 to the first file. The second page 804 belongs to the second-type page. A size of the second page may be 2 MB.

In step 904, the processor copies, to the second page, data of a plurality of consecutive first-type pages to which the page table points. For example, as shown in FIG. 8, the first file page table 800 points to the first-type page 802 in the NVM by using pointers 806 and 807. In this step, the processor may copy data (for example, Data 1 and Data 2 in FIG. 8) of a plurality of consecutive first-type pages 802 (for example, physical pages on which Data 1 and Data 2 in FIG. 8 are located) to the allocated second page 804. After the data is copied, the second page 804 includes the data of the plurality of consecutive first-type pages. It may be understood that, in this embodiment, the consecutive first-type pages are a plurality of first-type pages with consecutive addresses.

In step 906, the processor updates a pointer from pointing to the plurality of first-type pages in the page table to pointing to the second page. For example, as shown in FIG. 8, before the file page table for the first file is adjusted, the file page table 800 for the first file originally points to the first-type page 802 in the NVM by using pointers 806 and 807. In this step, the processor updates a pointer from pointing to the page table (as shown by 806 in FIG. 8) to pointing to the second page 804 in the NVM (as shown by 808 in FIG. 8). In this manner, the updated page table for the first file may directly point to the second page in the memory from the PMD. In other words, through adjustment on the first file page table, the first file page table is adjusted from a fourth-level page table to a three-level page table.

In step 908, the processor releases the plurality of consecutive first-type pages. For example, after the pointer for the first file page table is updated, to save storage space, the processor may release a page table to which the page table points. In addition, because combined data of the plurality of first-type pages has already been stored on the second page, the processor may instruct the NVM to release the plurality of consecutive first-type pages 802 to which all PTEs in the page table point.

In an exemplary embodiment, after the mapping manner of the first file page table is adjusted, the processor may process, based on an adjusted first file page table, a subsequent access request used to access the first file. For example, the processor may translate, based on the adjusted first file page table, an access address in the subsequent access request for accessing the first file into a physical address. As described above, to increase an access speed, some PTEs are loaded onto the TLB. Therefore, in this embodiment, after the mapping manner of the first file page table is adjusted from the first mapping manner to the second mapping manner, the processor is further configured to load the updated first file page table to the TLB, so that the MMU can translate a virtual address in the subsequent access request for the first file into the physical address based on the updated first file page table loaded onto the TLB.

The foregoing embodiment describes in detail the method for adjusting the mapping manner of the first file page table from the first mapping manner to a second mapping manner based on the type of the access to the first file. The first mapping manner is mapping a virtual address to a small page in the memory by using the file page table, the second mapping manner is mapping the virtual address to the large page in the memory by using the file page table. In other words, the foregoing embodiment is used to dynamically adjust, based on an exemplary access type, a file page table mapped to a small page to a file page table mapped to a large page, so that a TLB hit rate can be increased.

An embodiment further provides another file page table management method, to adjust, based on an exemplary access type, a file page table mapped to a large page to a file page table mapped to a small page. The following describes, by using a second file page table as an example, a method of adjusting a mapping manner of the second file page table based on a type of access to the second file.

Figure 10:
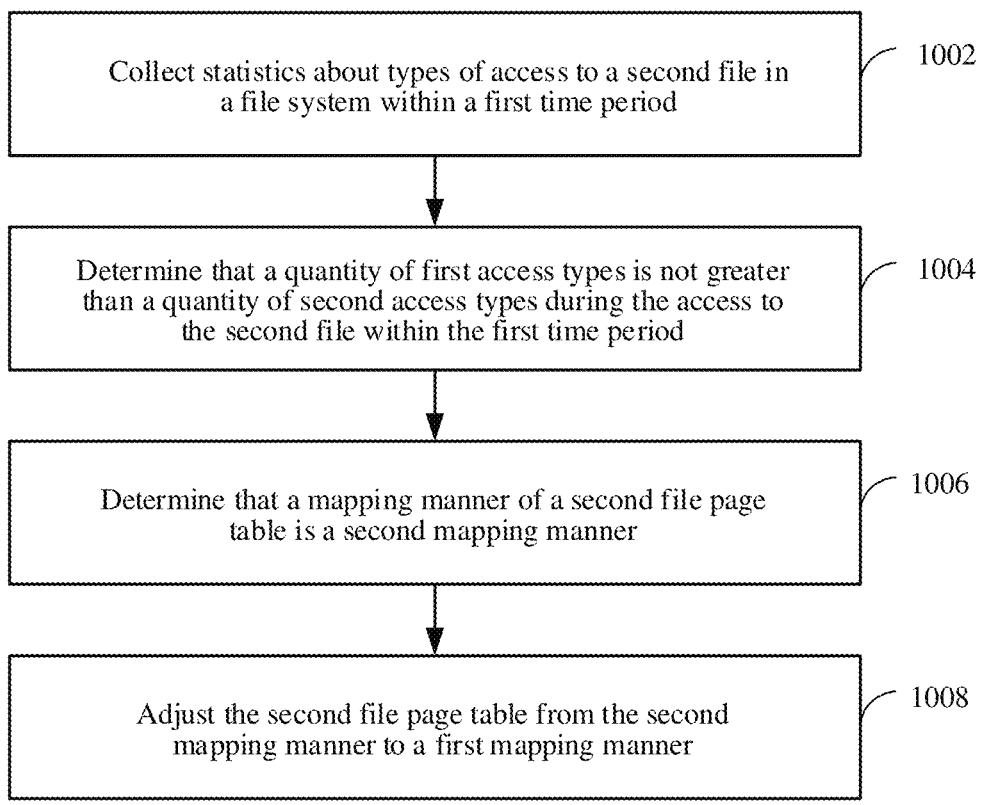
FIG. 10 is a method flowchart of another file page table management method according to an embodiment.

FIG. 10 is a method flowchart of another file page table management method according to an embodiment. The method shown in FIG. 10 may still be applied to the storage device in FIG. 1 on which the file system is created based on the memory. For example, the method may be executed by a processor in a device such as a storage device, a computer, or a server on which the file system is created based on the memory, for example, by the CPU 100 shown in FIG. 1. The following describes in detail the method in FIG. 10 with reference to FIG. 1. It should be noted that, to distinguish from the embodiment shown in FIG. 5, in the embodiment shown in FIG. 10, an example in which the second file page table is adjusted based on access to the second file within the first time period is used for description. It may be understood that each of the first file and the second file is any file in the memory file system provided in this embodiment. As shown in FIG. 10, the method may include the following steps.

In step 1002, the processor collects statistics about types of access to the second file in the file system within the first time period. For example, the access type may include sequential access and random access. The sequential access includes small-granularity sequential access and large-granularity sequential access. Random access includes small-granularity random access and large-granularity random access. For the access type in the embodiment shown in FIG. 10, refer to the description in the embodiment shown in FIG. 5. The processor may further determine, according to the method shown in FIG. 6, an access type of an access request for accessing the second file within the first time period. Further, in this embodiment, the processor may also record an access situation of different addresses of different files in the file system within the first time period based on the record table shown in FIG. 7. For example, as shown in FIG. 7, within the first time period, during access to the data in the second file FILE-2 with a start address of 4 MB, there are a total of 11 instances of small-granularity sequential access, a total of eight instances of medium-granularity sequential access, a total of two instances of large-granularity sequential access, 133 instances of small-granularity random access, a total of 17 instances of medium-granularity random access, and a total of six instances of large-granularity random access. For exemplary statistics about the access type, refer to the foregoing descriptions in FIG. 6 and FIG. 7. Details are not described again.

In step 1004, the processor determines that a quantity of first access types is not greater than a quantity of second access types during the access to the second file within the first time period. The first access type includes sequential access and large-granularity random access, and the second access type includes small-granularity random access. For example, within the first time period, during access to the FILE-2 with the start address of 4 MB, there are a total of 1+8+2+6=27 instances of access of the first access type and a total of 133 instances of access of the second access type. In this case, in this step, the processor determines that the quantity of first access types is less than the quantity of second access types during access to the second file with the start address of 4 MB within the first time period.

It may be understood that an example in which statistics is collected by access address in a file is used in FIG. 7. In this embodiment, a quantity of access types of access requests for accessing the second file within the first time period may be counted based on statistics about the access types of all the access addresses in the second file. For example, a quantity of sequential access of the access request for accessing the second file within the first time period is the sum of quantities of instances of sequencing all access addresses in the second file within the first time period. In this manner, the processor may determine that the quantity of first access types is not greater than the quantity of second access types during the access to the second file within the first time period. In another case, statistics about access types of all files may be directly recorded by file. This is not limited herein.

Figure 11:
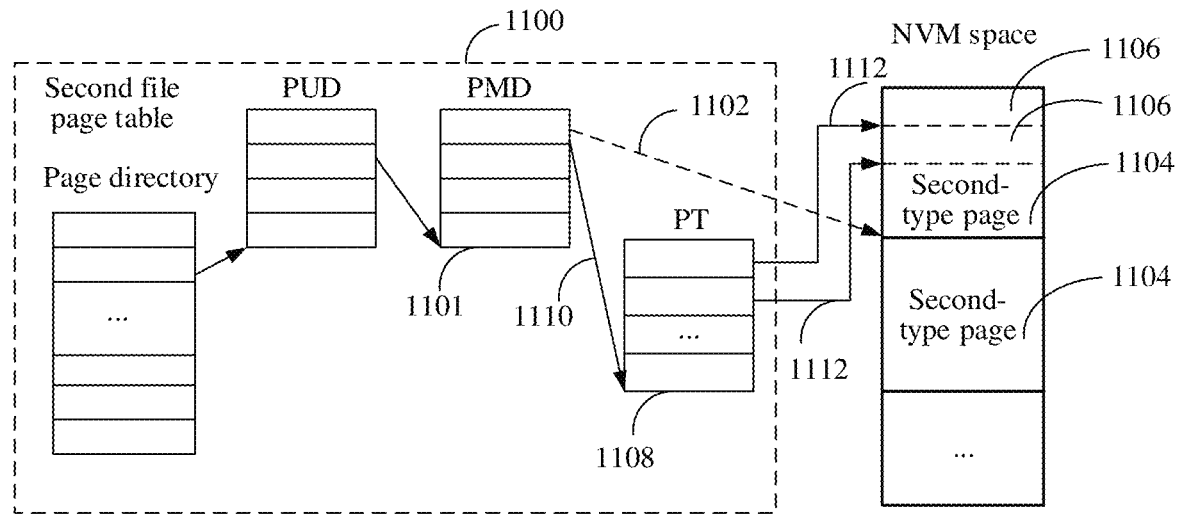
FIG. 11 is a schematic diagram of another adjustment of a file page table according to an embodiment.

In step 1006, the processor determines that a mapping manner of the second file page table is a second mapping manner. The second file page table is used to record a mapping relationship between a virtual address of an operating system and a memory page that stores data of the second file in the memory, and the second mapping manner includes establishing a mapping relationship between the virtual address of the operating system and a second-type page in the memory. The second-type page stores the data of the second file. As shown in FIG. 11, the second file page table is a file page table mapped to a large page. For example, a pointer of the PMD in the second file page table points to the second-type page 1104 in NVM space (refer to 1102 shown in FIG. 11). The second-type page 1104 is a large page. For example, a size of the second-type page may be 2 MB. The second-type page 1104 stores the data of the second file.

In step 1008, the processor adjusts the second file page table from the second mapping manner to a first mapping manner. The first mapping manner includes establishing a mapping relationship between the virtual address of the operating system and a first-type page in the memory, and a size of the first-type page is less than a size of the second-type page. For example, when the processor determines, after step 1104 and step 1106, that the quantity of first access types is not greater than the quantity of second access types during the access to the second file within the first time period, and determines that the second file page table is the second-type page (that is, the large page) mapped to the NVM, in this step, the processor adjusts the second file page table from the second mapping manner of mapping to the second-type page to the first mapping manner of mapping to the first-type page. In an exemplary embodiment, the processor may adjust the mapping manner of the second file page table according to the method shown in FIG. 12.

Figure 12:
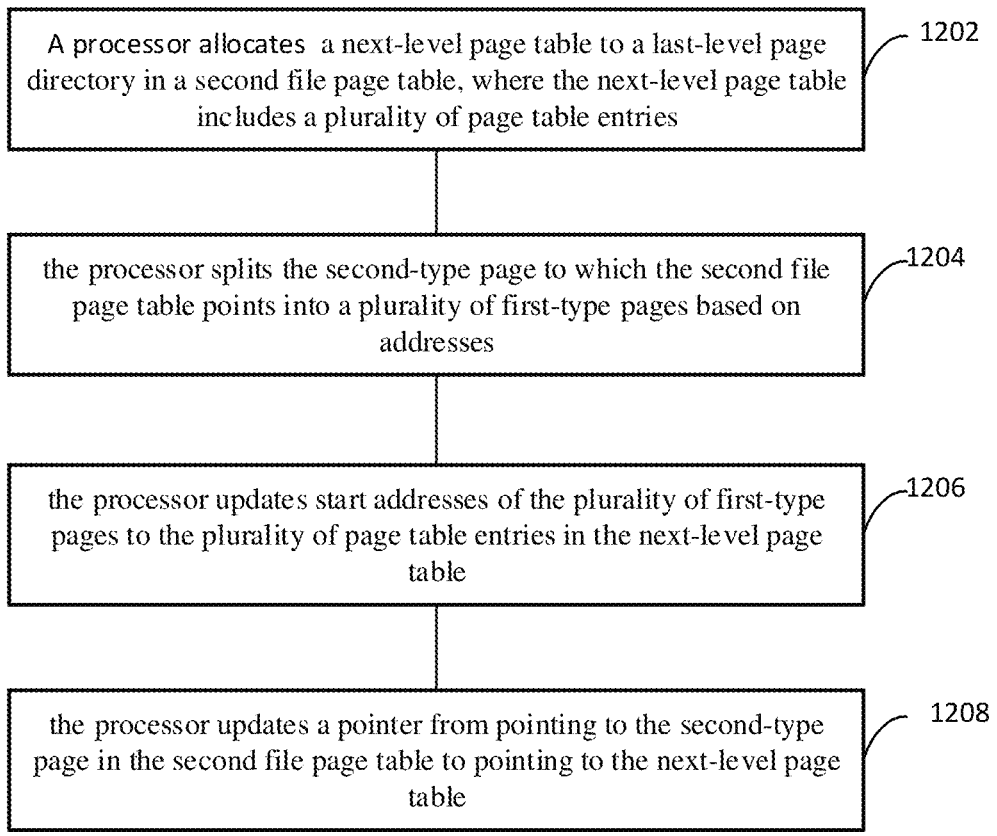
FIG. 12 is a flowchart of another page table adjustment method according to an embodiment.

FIG. 12 is a flowchart of another page table adjustment method according to an embodiment. As shown in FIG. 12, in step 1202, a processor allocates a next-level page table to a last-level page directory in a second file page table. The next-level page table includes a plurality of PTEs, and a PDE in the last-level page directory points to the second-type page in the NVM. For example, as shown in FIG. 11, a PDE in the last-level page directory PMD 1101 of the second file page table 1100 points to a second-type page 1104 in the NVM, and the second-type page 1104 is a large page. In this step, the processor may create a next-level page table 1108 of the last-level page directory PMD 1101. The page table 1108 includes a plurality of PTEs. For example, the page table 1108 may include 256 PTEs.

In step 1204, the processor splits the second-type page to which the second file page table points into a plurality of first-type pages based on addresses. As shown in FIG. 11, the second-type page 1104 may be split into a plurality of consecutive first-type pages 1106 according to an address. A size of the first-type page 1106 is less than a size of the second-type page 1104. For example, the size of the first-type page 1106 may be 4 KB.

In step 1206, the processor updates start addresses of the plurality of first-type pages to the plurality of PTEs in the next-level page table. For example, the processor may store the start addresses of the first-type page 1106 obtained through splitting into the PTEs of the page table respectively, so that each PTE in the page table 1108 includes a pointer pointing to one first-type page 1106. In this way, the first-type page 1106 in the NVM space can be addressed based on a PTE in the page table 1108.

In step 1208, the processor updates a pointer from pointing to the second-type page in the second file page table to pointing to the next-level page table. For example, the processor may adjust a pointer from pointing to the second-type page 1104 (as shown by an arrow 1102 in FIG. 11) to pointing to a newly created page table 1108 (as shown by an arrow 1110 in FIG. 11). For example, a start address of the page table 1108 may be executed. In this way, the page table 1108 is addressed based on the PDE of the PMD 1101, and the first-type page in the NVM is addressed by using the PTE of the page table 1108.

In the manner shown in FIG. 12, the second file page table mapped to the large page may be adjusted to being mapped to the small page. In an exemplary embodiment, after adjusting the mapping manner of the second file page table, the processor may process, based on an adjusted second file page table, a subsequent access request for accessing the second file. For example, the processor may translate, based on the adjusted second file page table, an access address in the subsequent access request for accessing the second file into a physical address. For example, after adjusting the mapping manner of the second file page table from the second mapping manner to a first mapping manner, the processor is further configured to load the updated second file page table to a TLB, so that an MMU can translate, based on the updated second file page table loaded to the TLB, a virtual address in the subsequent access request for accessing the second file into a physical address in a memory.

It may be contemplated from the foregoing embodiment shown in FIG. 10 that when the processor determines that there is a relatively large amount of small-granularity random access during access to the second file within the first time period, the processor may adjust the second file page table, for example, adjusting the mapping manner of the second file page table from the second mapping manner to the first mapping manner. In this manner, the second file page table mapped to the large page is adjusted to being mapped to the small page. Further, the processor may process a subsequent file access request based on the adjusted second file page table. In this way, a waste of storage space is reduced, and processing efficiency of a computer system is improved.

It should be noted that the embodiments shown in FIG. 5 and FIG. 10 may be applied to the same computer system. For example, in a case, the file page table of the first file is adjusted within the first time period by using the method shown in FIG. 5, and the file page table of the second file is adjusted within the first time period by using the method shown in FIG. 10. In another case, the first file page table may also be adjusted based on the access type of the first file page table within the first time period by using the method shown in FIG. 5, while the first file page table is adjusted according to the method shown in FIG. 10 based on access to the first file page table within a second time period. In still another case, a page table mapped to a first partial address (for example, an address space of 1 MB to 4 MB) of the first file may further be adjusted within the first time period according to the method shown in FIG. 5, while a page table mapped to a second partial address of the first file is adjusted within the first time period according to the method in FIG. 10. This is not limited herein.

Further, the foregoing embodiment is described by using an example in which a file page table for a file is adjusted. In an exemplary embodiment, only a part of one file page table may alternatively be adjusted. For example, based on a type of access to data with an offset address of 1 MB to 4 MB in the first file, a PTE corresponding to the data with the offset address of 1 MB to 4 MB in the first file page table may be adjusted from being mapped to a small page in the memory to being mapped to a large page in the memory. In this manner, in a file page table, some PTEs may be mapped to large pages in the memory, and some PTEs are used to be mapped to small pages in the memory. This is not limited herein.

Figure 13:
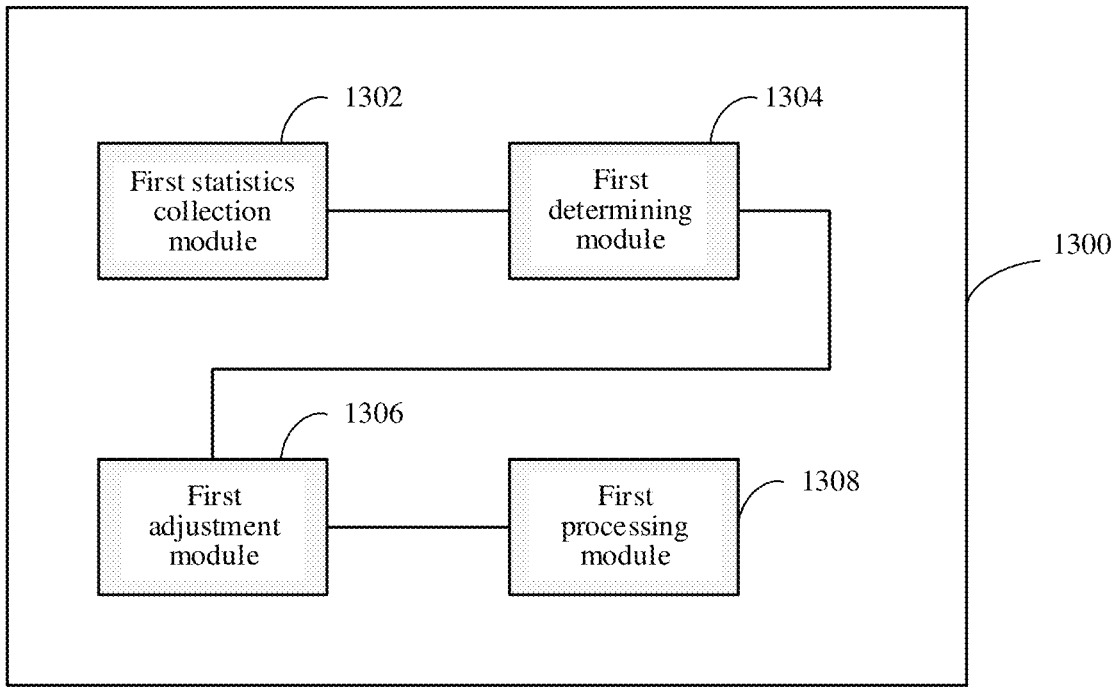
FIG. 13 is a schematic structural diagram of a page table management apparatus according to an embodiment.

FIG. 13 is a schematic structural diagram of a file page table management apparatus according to an embodiment. The apparatus may be configured to access a file system created based on a memory. The memory may be an NVM. As shown in FIG. 13, the file page table management apparatus 1300 may include a first statistics collection module 1302, a first determining module 1304, and a first adjustment module 1306. In an exemplary embodiment, the first statistics collection module 1302 is configured to collect statistics about types of access to a first file in the file system within a first time period. The first determining module 1304 is configured to determine that a quantity of first access types is greater than a quantity of second access types during the access to the first file within the first time period. The first access type includes sequential access and large-granularity random access, and the second access type includes small-granularity random access. The first determining module 1304 is further configured to determine that a mapping manner of a first file page table is a first mapping manner. The first file page table is used to record a mapping relationship between a virtual address of an operating system and a memory page that stores data of the first file in the memory, and the first mapping manner includes establishing a mapping relationship between the virtual address of the operating system and a first-type page in the memory. The first-type page stores the data of the first file. The first adjustment module 1306 is configured to adjust the first file page table from the first mapping manner to a second mapping manner. The second mapping manner includes establishing a mapping relationship between the virtual address of the operating system and a second-type page in the memory, and a size of the second-type page is greater than a size of the first-type page.

In a process of adjusting the first file page table from the first mapping manner to the second mapping manner, the first adjustment module 1306 is, for example, configured to allocate a second page in the memory to the first file. The second page belongs to the second-type page. After allocating the second page, the first adjustment module 1306 is configured to copy, to the second page, data of a plurality of consecutive first-type pages to which the page table points, and update a pointer from pointing to the plurality of first-type pages in the page table to pointing to the second page. In this way, the mapping manner of the first file page table is adjusted.

In another case, the page table management apparatus 1300 may further include a first processing module 1308. The first processing module 1308 is configured to process, based on an adjusted first file page table, a subsequent access request for accessing the first file.

Figure 14:
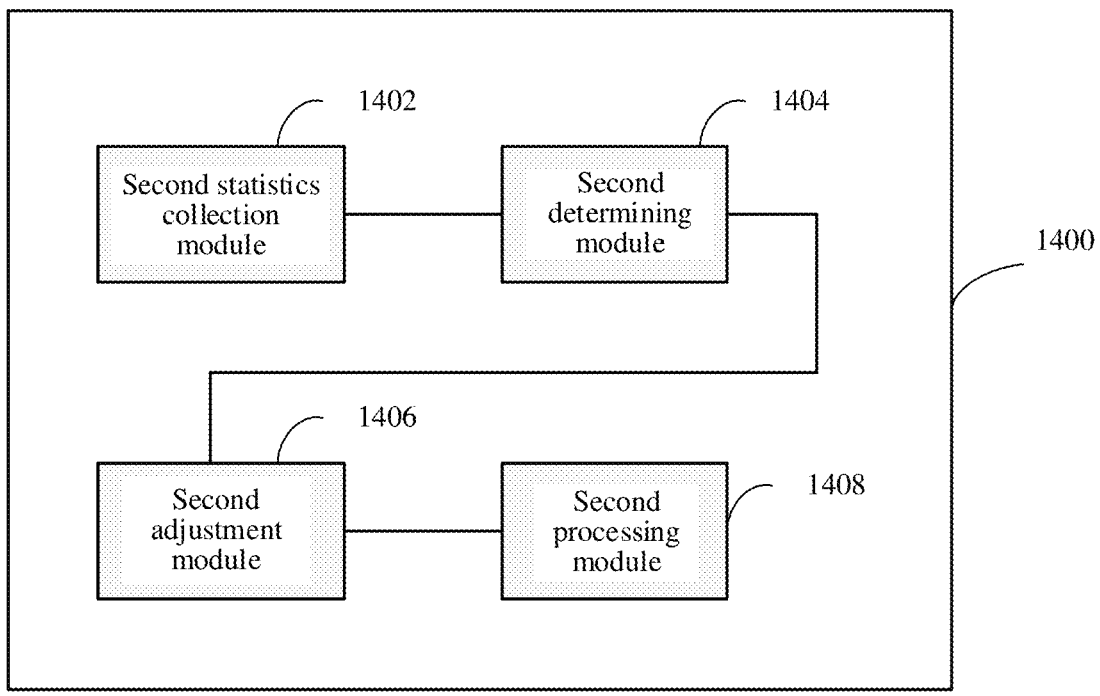
FIG. 14 is a schematic structural diagram of another page table management apparatus according to an embodiment.

FIG. 14 is a schematic structural diagram of another file page table management apparatus according to an embodiment. The apparatus may be configured to access a file system created based on a memory. The memory may be an NVM. As shown in FIG. 14, the file page table management apparatus 1400 may include a second statistics collection module 1402, a second determining module 1404, and a second adjustment module 1406.

The second statistics collection module 1402 is configured to collect statistics about types of access to a second file in the file system within a first time period. The second determining module 1404 is configured to determine that a quantity of first access types is not greater than a quantity of second access types during the access to the second file within the first time period. The first access type includes sequential access and large-granularity random access, and the second access type includes small-granularity random access. The second determining module 1404 is further configured to determine that a mapping manner of a second file page table is a second mapping manner. The second file page table is used to record a mapping relationship between a virtual address of an operating system and a memory page that stores data of the second file in the memory, and the second mapping manner includes establishing a mapping relationship between the virtual address of the operating system and a second-type page in the memory. The second-type page stores the data of the second file. The second adjustment module 1406 is configured to adjust the second file page table from the second mapping manner to a first mapping manner. The first mapping manner includes establishing a mapping relationship between the virtual address of the operating system and a first-type page in the memory, and a size of the first-type page is less than a size of the second-type page.

The page table management apparatus 1300 provided in this embodiment may execute the page table management method described in the embodiment in FIG. 5. The page table management apparatus 1400 provided in this embodiment may execute the page table management method described in the embodiment in FIG. 10. For detailed description of functions of the modules, refer to the description in the method embodiments, and details are not described again. It should be noted that the page table management apparatuses shown in FIG. 13 and FIG. 14 may be one apparatus, that is, the page table management apparatus shown in FIG. 13 may be configured to execute the foregoing page table management method shown in FIG. 5, or may be configured to execute the page table management method shown in FIG. 10. In this embodiment, separate description is provided only for clarity of description, but no limitation is imposed thereon.

It may be understood that the embodiments shown in FIG. 14 are merely examples. For example, division of the modules is merely logical function division and may be other division in an exemplary implementation. For example, a plurality of modules or components may be combined or integrated into another device, or some features may be ignored or may not be performed. In addition, the displayed or discussed mutual couplings or direct couplings or communication connections may be implemented by using some communications interfaces. The indirect couplings or communication connections between the modules may be implemented in an electrical form, a mechanical form, or another form.

The modules described as separate components may or may not be physically separate, and components displayed as modules may or may not be physical units. The components may be located in one position, or may be distributed onto a plurality of network units. Some or all of the modules may be selected as required to achieve the objectives of the solutions of the embodiments.

An embodiment further provides a computer program product for page table management. The computer program product includes a computer-readable storage medium that stores program code. An instruction included in the program code is used to execute the method process described in any one of the foregoing method embodiments. A person of ordinary skill in the art may understand that the foregoing storage medium may include any non-transitory machine-readable medium capable of storing program code, such as a USB flash drive, a removable hard disk, a magnetic disk, an optical disc, a random-access memory (RAM), an SSD, or an NVM.

It should be noted that the embodiments provided in this application are merely examples. A person skilled in the art may clearly know that, for convenience and conciseness of description, in the foregoing embodiments, the embodiments emphasize different aspects, and for a part not described in detail in an embodiment, refer to relevant descriptions of another embodiment. The embodiments and claims and features disclosed in the accompanying drawings may exist independently, or exist in a combined manner. Features described in a hardware form in the embodiments may be executed by software, and vice versa. This is not limited herein.

What is claimed is:

1. A file page table management method applied to a storage system with a processor, a memory, and a file system created based on the memory, the method comprising:
   collecting, by the processor, statistics about types of access to a first file in the file system within a first time period;
   performing a first determination, by the processor, that a quantity of first access types is greater than a quantity of second access types during the access to the first file within the first time period, wherein the first access type includes sequential access and large-granularity random access, and the second access type includes small-granularity random access;
   performing a second determination, by the processor, that a mapping manner of a first file page table is a first mapping manner, wherein the first file page table is used to record a mapping relationship between a virtual address of an operating system and a memory page that stores data of the first file in the memory, wherein the first mapping manner establishes a mapping relationship between the virtual address of the operating system and a first-type page in the memory, wherein the first-type page stores the data of the first file; and
   in response to the first determination and the second determination, adjusting, by the processor, the first file page table from the first mapping manner to a second mapping manner, wherein the second mapping manner establishes a mapping relationship between the virtual address of the operating system and a second-type page in the memory, and a size of the second-type page is greater than a size of the first-type page.

2. The method of claim 1, wherein the adjusting the first file page table from the first mapping manner to a second mapping manner comprises:
   allocating, by the processor, a second page in the memory to the first file, wherein the second page belongs to the second-type page;
   copying, by the processor to the second page, data of a plurality of consecutive first-type pages to which the page table points; and
   updating, by the processor, a pointer from pointing to the plurality of consecutive first-type pages in the page table to pointing to the second page.

3. The method according to claim 2, further comprising:
   releasing, by the processor, the plurality of consecutive first-type pages.

4. The method according to claim 1, further comprising:
   processing, by the processor based on an adjusted first file page table, a subsequent access request for accessing the first file.

5. The method according to claim 1, wherein the memory is a non-volatile memory.

6. A file page table management method applied to a storage system with a processor, a memory, and a file system created based on the memory, the method comprising:
   collecting, by the processor, statistics about types of access to a second file in the file system within a first time period;

performing a first determination, by the processor, that a quantity of first access types is not greater than a quantity of second access types during the access to the second file within the first time period, wherein the first access type includes sequential access and large-granularity random access, and the second access type includes small-granularity random access;

performing a second determination, by the processor, that a mapping manner of a second file page table is a second mapping manner, wherein the second file page table is used to record a mapping relationship between a virtual address of an operating system and a memory page that stores data of the second file in the memory, wherein the second mapping manner establishes a mapping relationship between the virtual address of the operating system and a second-type page in the memory, wherein the second-type page stores data of the second file; and in response to the first determination and the second determination, adjusting, by the processor, the second file page table from the second mapping manner to a first mapping manner, wherein the first mapping manner establishes a mapping relationship between the virtual address of the operating system and a first-type page in the memory, and a size of the first-type page is less than a size of the second-type page.

7. The method according to claim 6, wherein the adjusting, by the processor, the second file page table from the second mapping manner to a first mapping manner comprises:

allocating, by the processor, a next-level page table to a last-level page directory in the second file page table, wherein the next-level page table includes a plurality of page table entries, and a page directory entry in the last-level page directory points to the second-type page in the memory;

splitting, by the processor, the second-type page to which the second file page table points into a plurality of first-type pages based on addresses;

updating, by the processor, start addresses of the plurality of first-type pages to the plurality of page table entries in the next-level page table; and updating, by the processor, a pointer from pointing to the second-type page in the second file page table to pointing to the next-level page table.

8. The method according to claim 6, further comprising:
processing, by the processor based on an adjusted second file page table, a subsequent access request for accessing the second file.

9. The method according to claim 6, wherein the memory is a non-volatile memory.

10. A storage system, comprising:
a memory and a file system;
a processor connected to the memory, the processor configured to:
collect statistics about types of access to a first file in the file system within a first time period;
perform a first determination that a quantity of first access types is greater than a quantity of second access types during the access to the first file within the first time period, wherein the first access type includes sequential access and large-granularity random access, and the second access type includes small-granularity random access;
perform a second determination that a mapping manner of a first file page table is a first mapping manner, wherein the first file page table is used to record a mapping relationship between a virtual address of an operating system and a memory page that stores data of the first file in a memory, wherein the first mapping manner establishes a mapping relationship between the virtual address of the operating system and a first-type page in the memory, wherein the first-type page stores the data of the first file; and
in response to the first determination and the second determination, adjust the first file page table from the first mapping manner to a second mapping manner, wherein the second mapping manner establishes a mapping relationship between the virtual address of the operating system and a second-type page in the memory, and a size of the second-type page is greater than a size of the first-type page.

11. The storage system of claim 10, wherein in the step of the adjusting, the processor is configured to:
allocate a second page in the memory to the first file, wherein the second page belongs to the second-type page;
copy, to the second page, data of a plurality of consecutive first-type pages to which the page table points; and
update a pointer from pointing to the plurality of consecutive first-type pages in the page table to pointing to the second page.

12. The storage system according to the claim 11, wherein the processor is further configured to:
release the plurality of consecutive first-type pages.

13. The storage system according to the claim 10, wherein the processor is further configured to:
process, based on an adjusted first file page table, a subsequent access request for accessing the first file.

14. The storage system according to the claim 10, wherein the memory is a non-volatile memory.

15. A storage system, comprising:
a memory and a file system;
a processor connected to the memory, the processor configured to:
collect statistics about types of access to a second file in the file system within a first time period;
perform a first determination that a quantity of first access types is not greater than a quantity of second access types during the access to the second file within the first time period, wherein the first access type includes sequential access and large-granularity random access, and the second access type includes small-granularity random access;
perform a second determination that a mapping manner of a second file page table is a second mapping manner, wherein the second file page table is used to record a mapping relationship between a virtual address of an operating system and a memory page that stores data of the second file in a memory, wherein the second mapping manner establishes a mapping relationship between the virtual address of the operating system and a second-type page in the memory, wherein the second-type page stores data of the second file; and
in response to the first determination and the second determination, adjust the second file page table from the second mapping manner to a first mapping manner, wherein the first mapping manner establishes a mapping relationship between the virtual address of the operating system and a first-type page in the memory, and a size of the first-type page is less than a size of the second-type page.

16. The storage system according to claim 15, wherein in the step of the adjusting, the processor is configured to:

allocate a next-level page table to a last-level page directory in the second file page table, wherein the next-level page table includes a plurality of page table entries, and a page directory entry in the last-level page directory points to the second-type page in the memory;

split the second-type page to which the second file page table points into a plurality of first-type pages based on addresses;

update start addresses of the plurality of first-type pages to the plurality of page table entries in the next-level page table; and update a pointer from pointing to the second-type page in the second file page table to pointing to the next-level page table.

17. The storage system according to the claim 15, wherein the processor is further configured to:

process, based on an adjusted second file page table, a subsequent access request for accessing the second file.

18. The storage system according to the claim 15, wherein the memory is a non-volatile memory.

* * * * *